United States Patent
Van der Burgt et al.

(10) Patent No.: US 7,930,174 B2
(45) Date of Patent: Apr. 19, 2011

(54) DEVICE AND METHOD FOR NOISE SUPPRESSION

(75) Inventors: Chiron Van der Burgt, Enschede (NL); Hans Fiesel, Gundelfingen (DE)

(73) Assignee: Trident Microsystems (Far East), Ltd., Grand Caman (KY)

( * ) Notice: Subject to any disclaimer, the term of this patent is extended or adjusted under 35 U.S.C. 154(b) by 1558 days.

(21) Appl. No.: 11/133,146

(22) Filed: May 19, 2005
(Under 37 CFR 1.47)

(65) Prior Publication Data
US 2006/0047507 A1  Mar. 2, 2006

(30) Foreign Application Priority Data

May 19, 2004  (DE) .......................... 10 2004 025 300

(51) Int. Cl.
*G10L 21/02* (2006.01)
(52) U.S. Cl. ........ 704/225; 704/226; 381/317; 381/714; 330/284
(58) Field of Classification Search .................. 704/225, 704/226; 381/317, 71.4; 330/284
See application file for complete search history.

(56) References Cited

U.S. PATENT DOCUMENTS

| | | | | |
|---|---|---|---|---|
| 4,228,545 | A | | 10/1980 | Murakami .................... 455/296 |
| 4,323,730 | A | | 4/1982 | Brown ............................ 179/1 P |
| 4,494,551 | A | | 1/1985 | Little, III et al. .............. 128/696 |
| 4,577,161 | A | * | 3/1986 | Hirohashi et al. ............ 330/149 |
| 4,791,672 | A | * | 12/1988 | Nunley et al. ................. 381/317 |
| 4,811,018 | A | * | 3/1989 | Sakata .......................... 341/139 |
| 5,107,480 | A | | 4/1992 | Naus .......................... 369/47.35 |
| 5,373,295 | A | * | 12/1994 | Michon ......................... 341/159 |
| 5,615,270 | A | * | 3/1997 | Miller et al. ..................... 381/57 |
| 5,946,649 | A | * | 8/1999 | Javkin et al. .................. 704/203 |
| 6,493,450 | B1 | | 12/2002 | Scheuer et al. ................. 381/57 |
| 6,538,592 | B1 | | 3/2003 | Yang et al. .................... 341/155 |
| 6,639,540 | B1 | | 10/2003 | Kogo et al. ................... 341/155 |
| 7,567,677 | B1 | * | 7/2009 | Chan et al. .................... 381/71.1 |
| 2003/0043942 | A1 | * | 3/2003 | Ono .............................. 375/347 |

FOREIGN PATENT DOCUMENTS

| | | | |
|---|---|---|---|
| EP | 0208082 | 5/1986 | .......................... 3/34 |
| JP | 07297715 | 11/1995 | ............................. 1/8 |

* cited by examiner

*Primary Examiner* — Daniel D Abebe
(74) *Attorney, Agent, or Firm* — DLA Piper LLP (US)

(57) ABSTRACT

An analog signal is sampled to provide a digitized signal and the resultant digitized signal is output to a delay element, which provides a delayed digital signal. The analog signal is also input to an analog noise detector, which provides a noise detector output signal to a digital logic unit. The digital logic unit processes the noise detector output signal to determine if noise is present in the analog signal, and provides a control signal. An amplifier receives the delayed digital signal and reduces a gain applied to the delayed digital signal in response to the control signal, and provides an amplifier output signal.

12 Claims, 1 Drawing Sheet

DEVICE AND METHOD FOR NOISE SUPPRESSION

PRIORITY INFORMATION

This application claims priority from German application 10 2004 025 300.5 filed May 19, 2004, which is hereby incorporated by reference.

BACKGROUND OF THE INVENTION

The invention relates to a noise suppression device with a signal path and an analog/digital converter arranged in the signal path for converting an analog signal into a digital signal, as well as a digital amplifier, connected in series with the analog/digital converter, wherein an analog noise detector is provided for detecting a noise in the analog signal. Furthermore, the invention relates to a method for suppression of a noise in a signal wherein an analog signal in a signal path is converted by an analog/digital converter into a digital signal and the digital signal is regulated in its amplitude, wherein a noise in the analog signal is detected by an analog noise detector.

It is known that an analog noise detector can be provided with an analog logic unit for control of the detected signals in order to suppress noise in a signal. The implementation of an analog logic unit is extremely costly.

It was therefore proposed to move the detection of signal errors to the digital domain, i.e., after converting an analog signal into a digital signal. The noise detection in this case is performed by a digital detector. The drawback here is that errors above the full-scale range of the analog/digital converter cannot be detected.

There is a need for an improved system of detecting and suppressing noise within a signal.

SUMMARY OF THE INVENTION

The technique of the invention is especially suitable for use in audio and/or video systems in motor vehicles to eliminate repetitive signal disturbances caused by the engine ignition. In order to determine whether there are indeed signal errors in the detected signal segments, the analog noise detector is connected in series with a digital logic unit. The detection of errors in the analog signal domain has the advantage that signal errors can be detected in a larger bandwidth. The use in a digital logic unit, in turn, is an advantage, since this is relatively easy to implement. By connecting a digital logic unit in series, the risk of a "false alarm" is substantially reduced.

If the digital logic unit detects that noise is indeed present, it presents corresponding control signal to the digital amplifier, which is thereby at least regulated down at the right moment so that the noise in the signal path can be disregarded or is entirely suppressed.

In order to ensure that the control signal of the digital logic unit and the corresponding noise in the signal path arrive simultaneously at the digital amplifier, it is advantageous to provide for a delay of the digital signal in the signal path. For this, it may be sufficient to resort to the usual components in the signal path and to design them accordingly for the required delay time. If necessary, an additional delay element or an intermediate storage may be integrated into the signal path.

In one embodiment of the invention, it is advantageous to use a regulatable peak detector as the analog noise detector. This ensures an adaptive noise suppression system. The noise detector can be calibrated by feedback to the digital logic unit. Information determined by the analog noise detector may be used when checking the signal segments detected as noise by the digital logic unit. The digital logic unit may include a processor and associated executable program instructions.

The digital logic unit may be configured so that several signal segments, detected by the analog noise detector, are collected in a particular time window, and the digital logic unit acts to control the digital amplifier when a certain number of detected signal segments occur in the time window.

These and other objects, features and advantages of the present invention will become more apparent in light of the following detailed description of preferred embodiments thereof, as illustrated in the accompanying drawings.

BRIEF DESCRIPTION OF THE DRAWING

The FIGURE is a block diagram illustration of a noise suppression device.

DETAILED DESCRIPTION OF THE INVENTION

Figure 1:
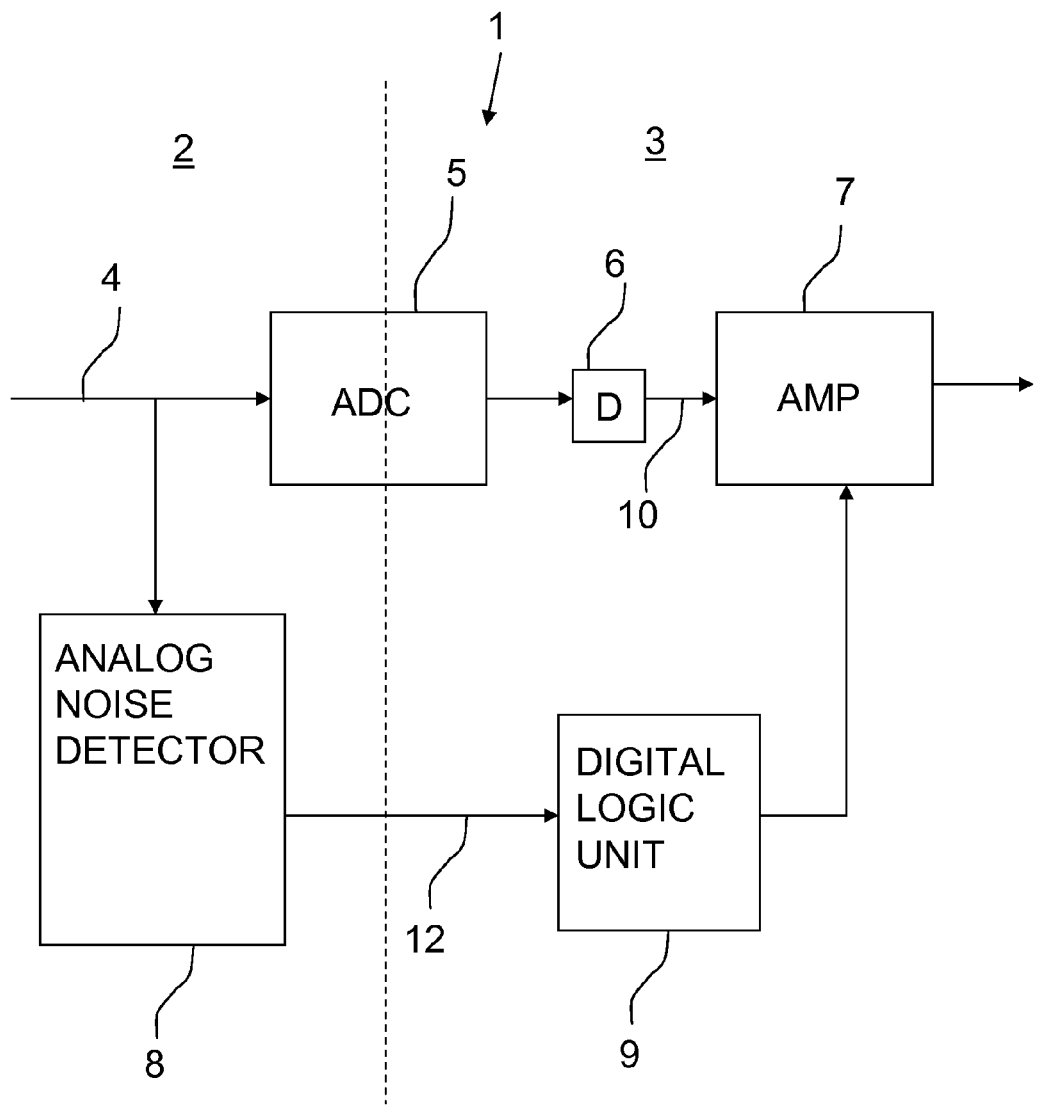

A noise suppression device 1 can be divided into an analog domain 2 and a digital domain 3. In the signal path there is provided an analog-to-digital converter (ADC) 5 for converting an analog signal on a line 4 into a digital signal. The ADC 5 provides a digitized signal to a delay element 6. The delay element 6 provides a delayed signal on a line 10 to a digital amplifier 7.

The device 1 also includes an analog noise detector 8 for detecting noise in the analog signal on the line 4 and providing a noise detector signal on a line 12. The signal segments (peaks) detected by the regulatable analog noise detector 8 are provided to a digital logic unit 9. The digital logic unit 9 determines whether there is indeed noise, i.e., a signal error, in the detected signal segments. If the digital logic unit 9 recognizes a signal error, it acts to control the digital amplifier 7.

The digital logic unit 9 collects several signal segments detected by the analog noise detector 8 in a particular time window. If the number of detected peaks in this window exceeds a particular number, then noise (signal error) is present. By collecting several signal segments in one time window, the signal flow in the digital amplifier 9 is delayed. In order for a particular detected signal segment in the signal path 4 to arrive at the same time as the corresponding control signal of the logic unit 9 at the digital amplifier, the delay element 6 is provided. Because of the control signal of the logic unit 9, the digital amplifier 7 is reduced sufficiently in its gain at the right time that the defective signal segment is sufficiently attenuated, and thus suppressed.

Although the present invention has been shown and described with respect to several preferred embodiments thereof, various changes, omissions and additions to the form and detail thereof, may be made therein, without departing from the spirit and scope of the invention.

What is claimed is:

1. A noise suppression device, comprising an analog-to-digital converter for converting an analog signal into a digitized signal, as well as a digital amplifier connected in series to the analog-to-digital converter, and an analog noise detector for detecting noise in the analog signal, wherein the analog noise detector is connected in series to a digital logic unit to check a signal segment detected by the analog noise detector, and the digital logic unit is arranged to act on and control the digital amplifier in order to suppress noise in the digitized signal.

2. A noise suppression device according to claim 1, further comprising at least one delay element or an intermediate storage integrated to delay the digitized signal.

3. A noise suppression device according to claim 2, wherein the analog-to-digital converter, delay element, and digital amplifier operate so that a noise in the digitized signal arrives at the same time as a corresponding control signal of the digital logic unit at the digital amplifier.

4. A noise suppression device according to claim 1, wherein the analog noise detector comprises a regulatable peak detector.

5. A method for suppressing a noise in a signal, wherein an analog signal is converted by an analog-to-digital converter into a digital signal and the digital signal is regulated in its amplitude, wherein noise in the analog signal is detected by an analog noise detector, the method comprising: determining with a digital logic unit whether the signal segment detected by the analog noise detector is noise and, if it is noise, then controlling a digital amplifier that receives the digital signal in order to suppress the noise in the digital signal.

6. The method according to claim 5, wherein the digital amplifier is switched off for the duration of the noise by the digital logic unit.

7. The method according to claim 5, further comprising the step of: delaying the digital signal.

8. The method according to claim 5, further comprising the step of delaying the digital signal such that noise in the digital signal arrives at the digital amplifier at the same time as a corresponding control signal of the digital logic unit.

9. The method according to claim 5, wherein an analog noise detector comprises a regulatable peak detector.

10. The method according to claim 5, further comprising the steps of:
collecting several signal segments detected by the analog noise detector in a particular time window using the digital logic unit, and controlling the digital amplifier with the digital logic unit when a predefined number of detected signal segments occur in the time window.

11. The method according to claim 7, wherein a delay element or an intermediate storage is used to delay the digital signal.

12. A noise suppression device, comprising:
an analog-to-digital converter that converts an analog signal into a digital signal;
a delay element that receives the digital signal and provides a delayed digital signal;
a digital amplifier that receives the delayed digital signal and provides an output signal;
an analog noise detector that detects noise in the analog signal and provides a noise detector output signal; and
a digital logic unit that receives the noise detector output signal and controls the digital amplifier in order to suppress noise in the output signal.

* * * * *